United States Patent
Hu et al.

(10) Patent No.: US 7,846,541 B2
(45) Date of Patent: Dec. 7, 2010

(54) OPTICAL ELEMENT HAVING OPTICAL ADHESIVE LAYER AND POLARIZER

(75) Inventors: Xuequn Hu, Cincinnati, OH (US); Pradnya V. Nagarkar, Weston, MA (US); Gerald N. Nkwantah, Brockton, MA (US); Michael K. Gerlach, Saint Paul, MN (US); James P. DiZio, Saint Paul, MN (US); Gregg S. Cannavo, Upton, MA (US)

(73) Assignee: Seiko Epson Corporation, Tokyo (JP)

( * ) Notice: Subject to any disclaimer, the term of this patent is extended or adjusted under 35 U.S.C. 154(b) by 574 days.

(21) Appl. No.: 11/934,549

(22) Filed: Nov. 2, 2007

(65) Prior Publication Data

US 2009/0117378 A1     May 7, 2009

(51) Int. Cl.
B32B 7/12 (2006.01)
B29D 11/00 (2006.01)

(52) U.S. Cl. ..................... 428/354; 264/1.31
(58) Field of Classification Search ............... 428/354; 264/1.31
See application file for complete search history.

(56) References Cited

U.S. PATENT DOCUMENTS

| | | | |
|---|---|---|---|
| 5,484,864 A * | 1/1996 | Usifer et al. ........... 526/301 |
| 5,666,223 A | 9/1997 | Bennett et al. | |
| 5,910,522 A | 6/1999 | Schmidt et al. | |
| 6,337,118 B1 * | 1/2002 | Takehana et al. ........... 428/64.1 |
| 6,720,375 B2 | 4/2004 | Suzuki et al. | |
| 6,800,366 B2 | 10/2004 | Chang et al. | |
| 7,550,182 B2 * | 6/2009 | Inagaki et al. ........... 428/1.33 |
| 7,691,925 B2 * | 4/2010 | Amano et al. ........... 524/99 |
| 2004/0202879 A1 | 10/2004 | Xia et al. | |
| 2005/0073065 A1 | 4/2005 | Mack et al. | |
| 2006/0108065 A1 | 5/2006 | Wang et al. | |
| 2006/0155061 A1 | 7/2006 | Liao et al. | |
| 2006/0225831 A1 | 10/2006 | Lei et al. | |
| 2007/0055006 A1 | 3/2007 | Kim et al. | |

OTHER PUBLICATIONS

Cael et al. "Molecular and Spectroscopic Properties of a Polarizer Based on a Block Copolymer of Vinylalcohol and Acetylene", *Macromol. Symp*, 154, 45-57 (2000).

* cited by examiner

*Primary Examiner*—Thao T. Tran
(74) *Attorney, Agent, or Firm*—Oliff & Berridge PLC

(57) ABSTRACT

An optical element includes a polarizer having oriented vinylene segments; a substrate; and an adhesive layer disposed between the polarizer and the substrate, the adhesive layer comprising aliphatic urethane(meth)acrylate oligomer, (meth)acryl monomer, silane, and crosslinker, the crosslinker comprising ethylene glycol diacrylate and/or pentaerythritol triacrylate. The optical element can have additional layers such as hardcoat layers, additional adhesive layers, and/or additional substrates. A method of making the optical element is also disclosed, as are optical devices including the optical element.

25 Claims, 4 Drawing Sheets

OPTICAL ELEMENT HAVING OPTICAL ADHESIVE LAYER AND POLARIZER

FIELD OF INVENTION

This disclosure relates to an optical element having an optical adhesive layer used to bond two optical layers. In particular, the optical adhesive layer is used to bond a polarizer to a substrate.

BACKGROUND

Linear light polarizers, in general, owe their properties of selectively passing radiation vibrating along a given electromagnetic radiation vector, and absorbing electromagnetic radiation vibrating along a second given electromagnetic radiation vector, to the anisotropic character of the polarizer. Dichroic polarizers are absorptive, linear polarizers having a vectoral anisotropy in the absorption of incident light. The term "dichroism" as used herein refers to the property of differential absorption and transmission of the components of an incident beam of light depending on the direction of vibration of the components. Generally, a dichroic polarizer will transmit radiant energy along one electromagnetic vector and absorb energy along a perpendicular electromagnetic vector. A beam of incident light, on entering a dichroic polarizer, encounters two different absorption coefficients, one low and one high, so that the emergent light vibrates substantially in the direction of low absorption (high transmission).

Examples of synthetic dichroic polarizers are intrinsic polarizers, e.g., a polyvinylene-based polarizer such as a K-type polarizer. An intrinsic polarizer derives its dichroism from the light-absorbing properties of its matrix, rather than from the light-absorbing properties of dye additives, stains, or suspended crystalline material. Typically, intrinsic polarizers comprise a sheet or film of oriented poly(vinyl alcohol) having an oriented suspension of a dehydration product of polyvinyl alcohol, i.e., polyvinylene. Intrinsic polarizers of this kind are typically formed by heating the polymeric film in the presence of an acidic vapor dehydration catalyst, such as vapors of hydrochloric acid, to produce conjugated polyvinylenes and unidirectionally stretching the polymeric film prior to, subsequent to, or during the dehydration step to align the poly(vinyl alcohol) matrix. By orienting the poly(vinyl alcohol) matrix unidirectionally, the transition moments of the conjugated polyvinylenes or chromophores are also oriented, and the material becomes visibly dichroic. A second orientation step or extension step and a boration treatment may be employed after the dehydration step. An improved K-type polarizer is known as a KE-type polarizer and has improved stability under various conditions such as high temperature.

SUMMARY

In one aspect, an optical element is disclosed herein, comprising: a polarizer comprising oriented vinylene segments; a substrate; and an adhesive layer disposed between the polarizer and the substrate, the adhesive layer comprising an aliphatic urethane(meth)acrylate oligomer, a (meth)acryl monomer, a silane, and a crosslinker, the crosslinker comprising ethylene glycol diacrylate and/or pentaerythritol triacrylate. In one embodiment, the polarizer comprises a KE-type polarizer. The substrate can comprise cellulose, such as cellulose triacetate.

In one embodiment, the aliphatic urethane(meth)acrylate oligomer used in the adhesive layer may be derived from a polyester polyol, multifunctional isocyanate and (meth)acrylate monomer. The silane can comprise (3-glycidoxypropyl)trimethoxysilane or [3-(2-aminoethylamino)propyl]trimethoxysilane. In one embodiment, the adhesive layer comprises from about 20 to about 40 wt. % of the aliphatic urethane(meth)acrylate oligomer, from about 40 to about 60 wt. % of the (meth)acryl monomer, from about 2 to about 10 wt. % of the silane, and from about 3 to about 25 wt. % crosslinker. The optical element can comprise additional layers such as hardcoat layers, additional adhesive layers, and/or additional substrates.

In another aspect, a method of making an optical element is disclosed herein, comprising: providing a polarizer comprising oriented vinylene segments; providing a substrate; dispensing a UV-curable adhesive between the polarizer and the substrate to form a UV-curable layer between the polarizer and the substrate, the UV-curable adhesive comprising an aliphatic urethane(meth)acrylate oligomer, a (meth)acryl monomer, a silane, and a crosslinker, the crosslinker comprising ethylene glycol diacrylate and/or pentaerythritol triacrylate; and applying actinic radiation to cure the UV-curable layer.

In another aspect, an optical device is disclosed herein, comprising: a light source, and the above-described optical element. In one embodiment, the optical device comprises a projection system.

These and other aspects of the invention are described in the detailed description below. In no event should the above summary be construed as a limitation on the claimed subject matter which is defined solely by the claims as set forth herein.

BRIEF DESCRIPTION OF THE DRAWINGS

The invention may be more completely understood in consideration of the following detailed description in connection with the following figures.

DETAILED DESCRIPTION

The optical element disclosed herein may provide one or more advantages. An adhesive composition is used to bond a polarizer having vinylene segments to a substrate, particularly a cellulosic substrate. In some embodiments, an adhesive layer formed using the adhesive composition maintains a good bond between the polarizer and the substrate while minimizing, and in some cases preventing, the polarizer from cracking even when the optical element is subjected to elevated temperature and humidity conditions. In some embodiments, the optical adhesive layer may provide adequate bonding despite the mechanical anisotropy of the polarizer. As described above, polarizers comprising oriented vinylene segments are made by uniaxial stretching in the machine direction that is required to orient the polymer chains. This stretching imparts anisotropic mechanical properties to the film such that it exhibits brittle failure at high tensile strength values. The optical adhesive layer may also provides adequate bonding despite dimensional changes that can occur for each of the layers.

The optical element may also be advantageous in that it is formed using a UV-curable adhesive composition. The use of a UV-curable adhesive composition allows for higher throughput (no need for a separate pass for adhesive coating followed by cure), quick cure, and thinner coatings. In some embodiments, no solvent or other volatiles are emitted during manufacture.

In some embodiments, the optical element may also provide advantages by being environmentally robust when used in projector systems, surviving for up to about 1000 hours at 85° C. and 100° C., and at 60° C. under 90% relative humidity. In some embodiments, the method used to manufacture the optical element may be advantageous compared to conventional manufacturing processes in which cellulose triacetate, for example, must be hydrolyzed in order for it to be adhered to a KE-type polarizer.

Figure 1:
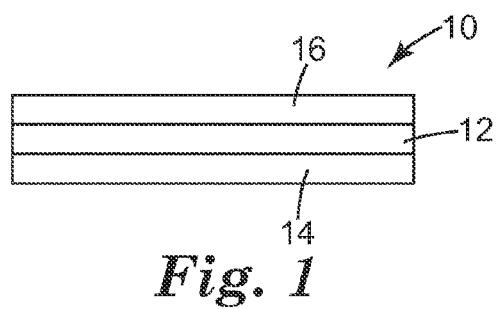
FIGS. 1 and 2 show exemplary optical elements.
Figure 2:
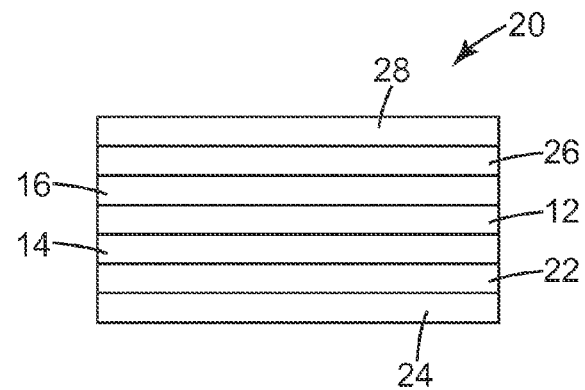

FIG. 1 shows an exemplary optical element 10, which may be used as part of an optical device. The optical element 10 includes adhesive layer 12 which bonds polarizer 14 and substrate 16. FIG. 2 shows another exemplary optical element 20 which includes adhesive layer 12, polarizer 14, substrate 16, and optional additional layers. Polarizer 14 is adhered to second substrate 24 using pressure sensitive adhesive layer 22. Disposed on substrate 16 is hardcoat layer 26 and antireflective layer 28 as shown.

The polarizer may vary widely depending on the intended application, with suitable polarizers comprising oriented polyvinylene segments. In one embodiment, the polarizer may be an intrinsic polarizer such as a K-type polarizer or a KE-type polarizer which is available from 3M Company. KE-type polarizers have excellent resistance to high temperatures for extended periods of time, which makes them a preferred choice for use in display and projection systems. Absorptive dichroic plane polarizing films such as H-type polarizers and dyestuff polarizers may also be used. Intrinsic polarizers are described, for example, in U.S. Pat. No. 5,666,223 (Bennett et al.) and US 2005/073065 A1 (Mack et al.); and in Cael, J. J. and Trapani, G. *Macromol. Symp.* 154, 45-57 (2000). The polarizer may have any desirable thickness, e.g., from about 5 to about 100 μm, from 10 to 50 μm, or from 15 to 40 μm.

The substrate may have one or more physical and optical properties that are well suited for use in optical devices, particularly projection systems. The substrate should preferably have physical properties such as, for example, a coefficient of thermal expansion selected to minimize the overall stress in the optical element. For example, the curable composition preferably has volume shrinkage of less than about 10%, more preferably less than about 5%, during the manufacturing process. Appropriate selection of physical properties may extend the life of the optical element and provide higher optical performance. Examples of suitable materials include cellulose materials such as cellulose esters. Particular examples include cellulose triacetate (TAC), cellulose acetate, cellulose acetate butyrate, nitrocellulose, polycarbonates, norbornene-based cyclic olefin copolymer films, and polyesters such as polyethylene terephthalate. In one embodiment, the substrate comprises TAC. The substrate may have any desirable thickness, e.g., from about 40 to about 125 μm. In some embodiments. the substrate may be at least partially transparent to the UV-radiation used to cure the adhesive layer.

The adhesive layer comprises a reaction product of several components including an aliphatic urethane(meth)acrylate oligomer. As used herein, (meth)acrylate refers to both acrylate and methacrylate functionality. In general, these oligomers comprise the reaction product of a polyol with a multifunctional isocyanate, followed by termination with a hydroxy-functionalized (meth)acrylate. For example, the aliphatic urethane(meth)acrylate oligomer may be formed from an aliphatic polyester or polyether polyol prepared from condensation of an aliphatic dicarboxylic acid, e.g., adipic acid or maleic acid, and an aliphatic diol, e.g. diethylene glycol or 1,6-hexane diol. In one embodiment, the polyester polyol comprises adipic acid and diethylene glycol. The multifunctional isocyanate may also be aliphatic such as methylene dicyclohexylisocyanate or 1,6-hexamethylene diisocyanate. The hydroxy-functionalized (meth)acrylate may comprise a hydroxyalkyl(meth)acrylate such as 2-hydroxyethyl acrylate, 2-hydroxypropyl(meth)acrylate, 4-hydroxybutyl acrylate, or polyethylene glycol(meth)acrylate. In one embodiment, the aliphatic urethane(meth)acrylate oligomer comprises the reaction product of a polyester polyol, methylene dicyclohexylisocyanate, and hydroxyethyl acrylate. The adhesive layer comprises from about 20 to about 40 wt. % of the aliphatic urethane(meth)acrylate oligomer.

Another component used to prepare the adhesive layer is a (meth)acryl monomer. Useful (meth)acryl monomers include (meth)acrylates and (meth)acrylamides, for example, a mixture of isobornyl acrylate and N,N-dimethylacrylamide. Other monomers may include a hydrophilic(meth)acrylate such as ethoxyethoxyethyl acrylate, or a higher refractive index (meth)acrylate such as phenylethyl acrylate, or an adhesion promoting (meth)acrylate such as tetrahydrofurfuryl acrylate. The adhesive layer comprises from about 40 to about 60 wt. % of the (meth)acryl monomer.

A silane is also used in the adhesive layer composition. In general, the silane is added to improve adhesion of the adhesive layer. Useful silanes are trialkoxysilanes having a reactive end group. Examples include (3-glycidoxypropyl)trimethoxysilane and [3-(2-aminoethylamino)propyl]trimethoxysilane. Other silanes may include 3-aminopropyltriethoxy silane, B-(3,4-epoxycyclohexyl)ethyltriethoxy silane, and 3-isocyanatopropyltriethoxy silane. The adhesive layer comprises from about 2 to about 10 wt. % of the silane.

The adhesive layer also comprises a crosslinker, particularly ethylene glycol diacrylate and/or pentaerythritol triacrylate. The amount of crosslinker used can be from about 3 to about 25 wt. % of the adhesive layer. The particular amount used will depend upon the particular components present in the composition, as well as their respective amounts, and also upon which crosslinker is used, or if both are used. The particular crosslinker, and the amount used, may be selected so that the stiffness of the adhesive layer is great enough so as to prevent, or at least minimize, cracking of the polarizer. On the other hand, adhesion to the polarizer may decrease with increasing amount of crosslinker. Thus, the particular crosslinker and amount may be chosen so as to minimize any loss of adhesion to the polarizer. If adhesion decreases enough, edge delamination may be observed. In addition, the crosslinker is desirably selected so that it does not interfere with adhesion of the adhesive layer to either the polarizer or the substrate which can happen if the crosslinker undesirably reacts with the silane.

The particular choice of components used in the adhesive layer, as well as their respective amounts, may be influenced by a variety of factors. For one, they should be selected such that the adhesive layer provides adequate bonding between the polarizer and the substrate. For example, this can be characterized by a peel strength of at least about 400 g per 0.5 inches at 85° C. when measured according to the procedure described below in the examples. The components and their relative amounts should also be selected so that cracks and edge delamination are not observed according to the edge cutting test described below. In one embodiment, the adhesive layer comprises from about 20 to about 40 wt. % of the aliphatic urethane(meth)acrylate oligomer, from about 40 to about 60 wt. % of the (meth)acryl monomer, from about 2 to about 10 wt. % of the silane, and from about 3 to about 25 wt. % crosslinker.

The thickness of the adhesive layer is not particularly limited. In general, the adhesive layer is made to be as thin as possible, as long as the desired performance of the optical element is obtained. The thickness of the adhesive layer may be from about 3 to about 10 um.

The adhesive layer composition may further include a photoinitiator to improve the rate of cure and percent conversion of the composition. Conventional photoinitiators can be used such as benzophenones, acetophenone derivatives, such as α-hydroxyalkylphenylketones, benzoin alkyl ethers and benzil ketals, monoacylphosphine oxides, and bis-acylphosphine oxides. The photoinitiator is typically used in an amount of less than 1.0 wt. %.

The adhesive composition may be cured by exposure to any form of actinic radiation, such as visible light or UV radiation, but is preferably exposed to UVA (320 to 390 nm) or UVB (395 to 445 nm) radiation. Generally, the amount of actinic radiation should be sufficient to form a dimensionally stable solid mass; the amount of energy required for curing the composition may range from about 0.2 to 20.0 $J/cm^2$. Any suitable light source may be used for photopolymerization, including carbon arc lights, low, medium, or high pressure mercury vapor lamps, swirl-flow plasma arc lamps, xenon flash lamps, ultraviolet light emitting diodes (LEDs), ultraviolet light emitting lasers, and LED light sources.

Figure 3:
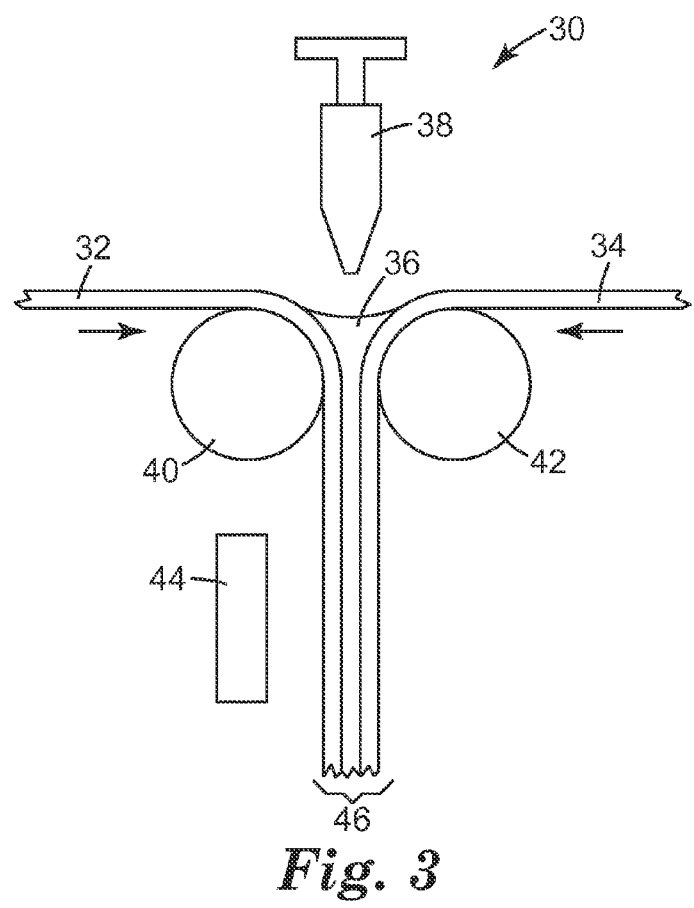
FIG. 3 shows a schematic diagram of an exemplary apparatus used to prepare exemplary optical elements.

The curable composition can be applied by any suitable coating means, one example is shown in FIG. 3. KE Polarizer 32 is moved in the forward direction by roller 40, and substrate 34 by roller 42. The rollers are positioned with respect to each other such that a nip impression is generated, which is not shown in the figure. That is, the two rollers touch each other, and the extent to which they are in contact can be characterized by a length, or nip impression. For example, a suitable nip impression may be several mm, or around 8 mm, or even higher. Syringe 38 is used to provide the adhesive composition 36 between the two layers to generate trilayer construction 46 which passes by UV curing station 44.

The optical element may comprise additional layers as described above for FIG. 2. In one embodiment, the optical element further comprises a hardcoat layer disposed on the substrate opposite the adhesive layer. The hardcoat layer may be used to protect the surface of the polarizer. Exemplary formulations for the hardcoat layer are described, for example, in U.S. Ser. No. 11/756,056 (Pokorny et al.). A typical hardcoat layer comprises a mixture of (meth)acrylate-functionalized nanoparticles with a multifunctional (meth) acrylate monomer. An anti-reflective layer may be provided on the hardcoat layer.

In one embodiment, the optical element further comprises a pressure sensitive adhesive layer disposed on the polarizer opposite the adhesive layer. The pressure sensitive adhesive layer can be used to adhere the optical element to a second substrate. Optical pressure sensitive adhesives may be used such high molecular weight (meth)acrylates that are crosslinked, for example, with isocyanates. Useful optical pressure sensitive adhesives are available from Soken Chemical & Engineering, Ltd.

The second substrate may be used to protect against mechanical stress, thermal degradation, and environmental contamination. The second substrate is generally an optically clear material such as fused silica, sapphire glass, quartz glass, borosilicate glass, or ceramic glasses. Polymeric materials such as, for example, polymethylmethacrylate, polycarbonate, and norbornene-based cyclic olefin copolymer films are also suitable.

The optical element may also comprise a construction, wherein the optical element comprises: first and second substrates; a polarizer disposed between the first and second substrates, the polarizer comprising oriented vinylene segments; and first and second adhesive layers disposed between the polarizer and the first and second substrates, respectively, the adhesive layers each comprising aliphatic urethane(meth) acrylate oligomer, (meth)acryl monomer, silane, and crosslinker, the crosslinker comprising ethylene glycol diacrylate and/or pentaerythritol triacrylate. The adhesive layers may be the same or different. The substrates may be the same or different.

The optical element disclosed herein may be used in a variety of optical devices, typically display devices comprising a light source. In one embodiment, the optical device comprises a projection system, for example, as described in US2006/0139574 A1 (Ralli et al.). The optical element is particularly suitable for use in transmissive, high temperature projection systems where brightness, contrast, and color uniformity are important. Typical applications include front screen projectors suitable for business applications, rear screen projectors suitable for televisions and movie display, and color single panel displays for use in vehicles. Other optical devices include LCD devices such as computer displays and televisions plus a variety of handheld devices.

The invention may be more completely understood in consideration of the following examples.

EXAMPLES

Materials

KE Polarizer comprised a dehydrated oriented sheet of high molecular weight polyvinyl alcohol (degree of polymerization 2400, MW greater than 90K) that was stretched approximately 7.5 times in the length direction. The polyvinyl alcohol sheet comprised 12 wt. % glycerin as plasticizer and was about 75 um thick before stretching. Dehydration was carried out to effect about 2-3% conversion of hydroxyl groups to vinylene segments. The dehydrated film was then exposed to hot boric acid that interacted with the unconverted hydroxyl groups to form a loose network of borated polyvinyl alcohol. Final thickness of KE Polarizer was about 25 um. A protective liner having a pressure sensitive adhesive on PET (from Lintec) was laminated to one side of KE Polarizer.

Cellulose triacetate film (TAC) was 127 um PF-S grade film obtained from Island Pyrochemical Industries; the film was subjected to corona discharge treatment before use. The hardcoat consisted of a UV-cured ceramer layer prepared similarly as described in U.S. Pat. No. 5,677,050 and containing PETA and acrylated colloidal silica. Protective masking, NOVACEL 9026 from Novacel Inc., was laminated to the hardcoat prior to windup. NOVACEL 9026 is an extruded polyethylene backed 2.0 mil masking film.

The Control Adhesive Composition was prepared as described below in Table 4, by combining 10.0 g of a commercially available adhesive (LOCTITE 3105 from Henkel Technologies) and 0.32 g of [3-(2-aminoethylamino)propyl]trimethoxysilane (SILQUEST A1120 from GE Silicones).

Mechanical Properties

Samples were tested according to procedures described in ASTM D-4065 Determining and Reporting Dynamic Mechanical Properties of Plastics, ASTM D-4092 Standard Terminology to Dynamic Mechanical Measurements on Plastics, ASTM E-473 Terminology Relating to Thermal Analysis, and ASTM E-11359-1 Thermomechanical Analysis (TMA) Part 1 General Principles.

Mechanical properties were measured using a TA Instruments Q800 series Dynamic Mechanical Analyzer (DMA) with film tension geometry. Temperature sweep experiments were performed in dynamic strain mode over the range of −40° C. up to 200° C. at 2° C./min. The storage (elastic) modulus and tan delta (loss factor) were reported as a function of temperature. Thermal Expansion measurements were made using a Perkin Elmer Thermomechanical Analyzer, TMA-7 with film tension geometry. Temperature sweep experiments were performed in expansion mode over the range of 20° C. up to 150° C. at 10° C./min. The Coefficient of Thermal Expansion (CTE) was reported as a function of temperature between 70 and 120° C. for the second heat cycle.

Dynamic Modulus Experiment Details:
  Instrument: TA Instruments Q800 Dynamic Mechanical Analyzer.
  Mode: DMA Multi Frequency.
  Geometry: Film Tension.
  Sample Length: ~15 mm.
  Strain Amplitude 15 μm.
  Sample Temperature Range: −40° C. to 200° C.
  Heating Rate: 2° C./min Coefficient of Expansion Experimental Details:
  Instrument: Perkin-Elmer TMA-7
  Geometry: Film Tension.
  Sample Length: ~12 mm.
  Base Force 25 mN.
  Sample Temperature Range: 0° C. to 150° C.
  Heating Rate: 10° C./min Tensile strength, break elongation, and modulus of elasticity were measured for 0.5 inch×3.0 inch samples of KE Polarizer. Results are shown in Table 1. Notching the sample before tensile testing showed a greater sensitivity in the machine direction. In the transverse direction, data was difficult to obtain for samples at 100° C. due to an increase in brittle failure, and notching the samples had minimal impact on transverse mechanical properties.

Figure 4:
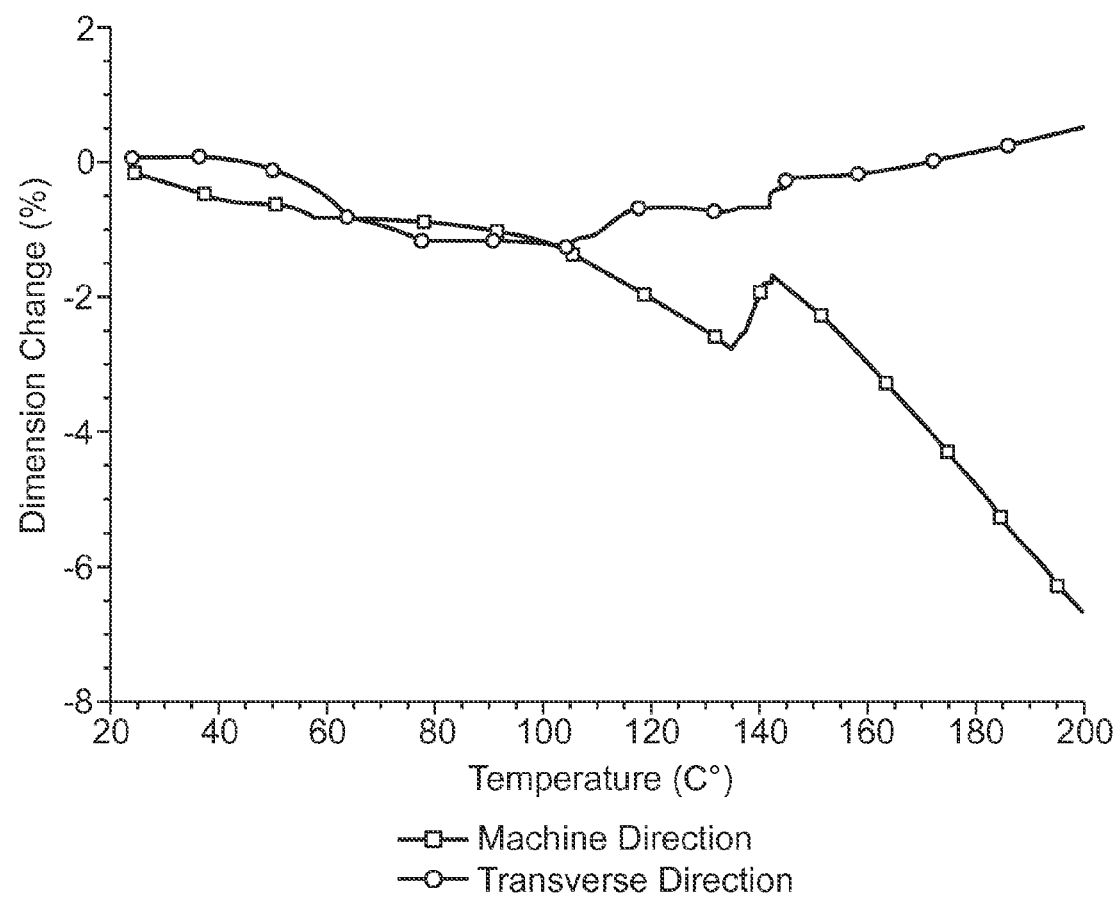
FIGS. 4-6 show mechanical properties of exemplary and comparative optical elements as a function of temperature.
Figure 5:
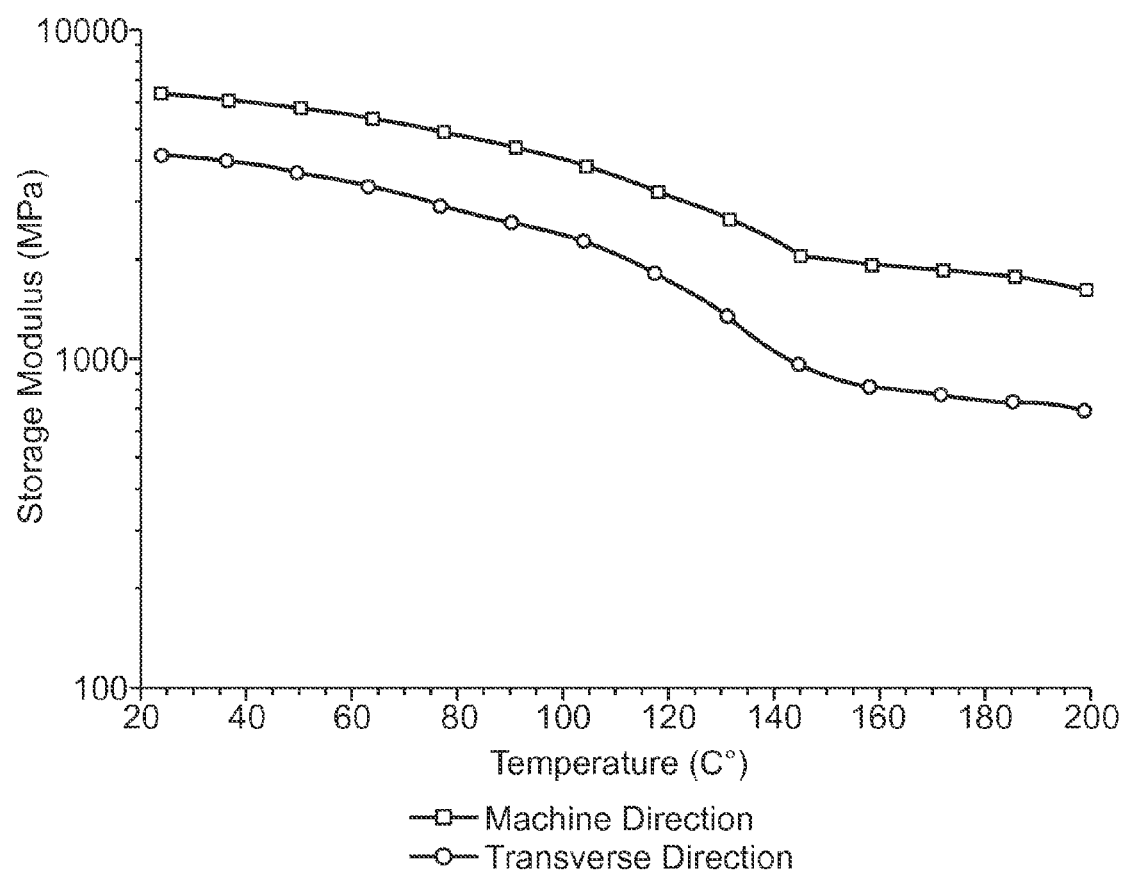
Figure 6:
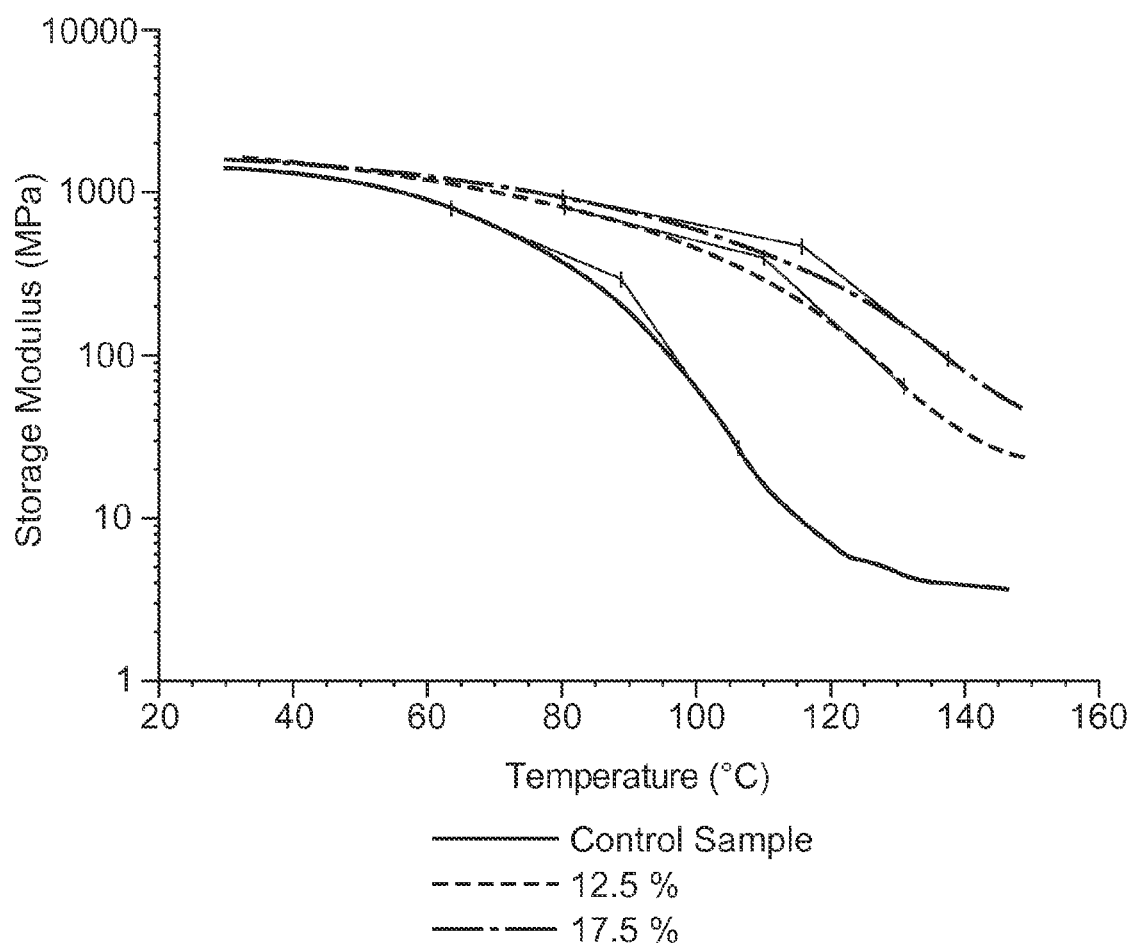

For various components of the optical element, dynamic mechanical analysis and thermo-mechanical analysis were carried out. Results are shown in Tables 2 and 3. A multilayer construction referred to as the Control Adhesive was prepared by coating the Control Adhesive composition between KE polarizer and TAC as described below. Thermo-mechanical analysis and dynamic mechanical analysis were carried out for the Control Example; results are shown in FIGS. 4 and 5, respectively.

TABLE 2

| Example | Modulus at 24° C. (MPa) | Modulus at 70° C. (MPa) | Modulus at 120° C. (MPa) |
| --- | --- | --- | --- |
| 127 um TAC | 3790 | 2860 | 1700 |
| 127 um TAC with 3 um Hardcoat | 4160 | 3370 | 2130 |
| 25 um KE Polarizer | 9420 | 8080 | 10000 |
| 7 um Control Adhesive | 0.8 | 360 | below limit |

TABLE 3

| Example | CTE (um/m° C.) | Shrinkage at 120° C. (%) | Expansion at 80° C. (%) | Expansion at 120° C. (%) |
| --- | --- | --- | --- | --- |
| 127 um TAC | 31 | 0.46 | na[1] | na |
| 127 um TAC with 3 um Hardcoat | 55 | na | 0.24 | 0.41 |
| 25 um KE Polarizer | na | 2.03 | na | na |
| 7 um Control Adhesive | na | na | 16.3 | na |

[1] not available

Preparation of Adhesive Compositions

Adhesive Compositions 1-4, Comparative Adhesive Compositions 1-8, and Control Adhesive were prepared as described in Table 4. The oligomer comprised an aliphatic urethane(meth)acrylate oligomer based on a polyester polyol of diethylene glycol and adipic acid, which was chain extended with methylene dicyclohexylisocyanate, and capped with hydroxyethyl acrylate. The weight ratios of these components used to make the oligomer were about 33:49:14:4 for diethyleneglycol, adipic acid, methylene dicyclohexylisocyanate, and hydroxyethyl acrylate, respectively. The (meth)acryl monomer comprised a mixture of isobornyl acrylate and N,N-dimethylacrylamide at a weight ratio of about 3:2, respectively. The silane comprised a mixture of (3-glycidoxypropyl)trimethoxy-silane and [3-(2-aminoethylamino)propyl]trimethoxysilane at a weight ratio of about

TABLE 1

| Property | Machine Direction at RT | Transverse Direction at RT | Machine Direction at 85° C. | Transverse Direction at 85° C. | Machine Direction at 100° C. |
| --- | --- | --- | --- | --- | --- |
| Tensile Strength (MPa) | 262 | 78 | 177 | 53 | 119 |
| Break Elongation (%) | 2.33 | 3.5 | 3.5 | 2.5 | 1.8 |
| Modulus of Elasticity (MPa) | 25191 | 4580 | 9202 | 3167 | 9700 |

6:1, respectively. Photoinitiator comprised IRGACURE 651 and triphenylphosphine hydrobromide at a weight ratio of about 4:1, respectively.

The adhesive compositions were each prepared by combining 10.0 g of a commercially available adhesive (LOCTITE 3105 from Henkel Technologies); 0.32 g of [3-(2-aminoethylamino)propyl]trimethoxysilane (SILQUEST A1120 from GE Silicones; and 0, 1.0, or 2.0 g of crosslinker.

TABLE 4

| Adhesive Composition | Oligomer (wt. %) | (Meth)acryl Monomers (wt. %) | Silanes (wt. %) | Crosslinker | Photoinitiator (wt. %) |
|---|---|---|---|---|---|
| 1 | 28.5 | 55.3 | 4.5 | 8.8 PETA | 2.8 |
| 2 | 26.2 | 50.9 | 4.1 | 16.2 PETA | 2.6 |
| 3 | 28.5 | 55.3 | 4.5 | 8.8 EGDA | 2.8 |
| 4 | 26.2 | 50.9 | 4.1 | 16.2 EGDA | 2.6 |
| Comparative 1 | 28.5 | 55.3 | 4.5 | 8.8 DEGDA | 2.8 |
| Comparative 2 | 26.2 | 50.9 | 4.1 | 16.2 DEGDA | 2.6 |
| Comparative 3 | 28.5 | 55.3 | 4.5 | 8.8 TEGDA | 2.8 |
| Comparative 4 | 26.2 | 50.9 | 4.1 | 16.2 TEGDA | 2.6 |
| Comparative 5 | 28.5 | 55.3 | 4.5 | 8.8 P575 EGDA | 2.8 |
| Comparative 6 | 26.2 | 50.9 | 4.1 | 16.2 P575 EGDA | 2.6 |
| Comparative 7 | 28.5 | 55.3 | 4.5 | 8.8 P700 EGDA | 2.8 |
| Comparative 8 | 26.2 | 50.9 | 4.1 | 16.2 P700 EGDA | 2.6 |
| Control | 31.3 | 60.7 | 4.9 | none | 3.1 |

PETA = pentaerythritol triacrylate,
EGDA = ethyleneglycol diacrylate,
DEGDA = diethyleneglycol diacrylate,
TEGDA = triethyleneglycol diacrylate,
P575 EGDA = polyethyleneglycol diacrylate having molecular weight of about 575,
P700 EGDA = polyethyleneglycol diacrylate having molecular weight of about 700.

Preparation of Optical Elements

Adhesive Compositions 1-4, Comparative Adhesive Compositions 1-8, and Control Adhesive were evaluated as follows. Using an apparatus as shown in FIG. 3, optical elements were prepared by delivering about 160 mL/hr of adhesive composition (age of about 2.5 hours) into a lamination nip formed by KE polarizer and TAC layer. Web speeds were about 5.4 feet/min and nip impression was about 8.3 mm. Total laydown of each adhesive composition was about 7 um. The trilayer construction was then passed through a UV curing station equipped with UV lamps (H-bulb) at 60% set point and a chill plate temperature of 50° C. Using an optical PSA, the constructions were adhered to glass. The cured optical elements were subjected to environmental testing as follows.

Evaluation of Adhesive Compositions

For each optical element, 21 chips were cut and the liners carefully removed. Cuts were made in the polarizer using a sharp scissors to make two cuts on the long edge of the chip (cuts in the machine direction). Cuts were about 1-1.5 mm long and roughly equally spaced from the chip corners. The cuts on one edge did not have to exactly line up with the cuts on the opposite edge. The chips were then placed in a metal container to prevent exposure to oven air currents. The metal containers were then placed in an oven at 100° C. for 64 hours. The chips were inspected for cracks on a light box using a cross polarizer, as a function of time. Any single partial or full crack on one chip was a failure (split) for that chip. Edge delamination was also evaluated and is designated failure (stressline).

Peel forces (bond strengths) were also measured for the optical elements using the following procedure. To determine the bond strength between KE polarizer and TAC substrate, a 180° peel test was carried out on an Instron Tester. Samples of KE/adhesive/TAC strip, each 13 mm×152 mm (½"×6") in the machine direction, were prepared for testing. The free end of TAC film was clamped on one end and the free end of KE was camped to peel at 180° at a rate of 0.5"/min. The sample was held at 85° C. for 1 minute prior to peeling with a preload of 50 psi. Results are shown in Table 5.

TABLE 5

| Optical Element | Adhesive Composition | Passed | Failed (Split) | Failed (Stressline) | Peel Force (g/0.5 in at 85° C.) |
|---|---|---|---|---|---|
| 1 | 1 | 14 | 0 | 7 | 438.0 |
| 2 | 2 | 21 | 0 | 0 | 445.0 |
| 3 | 3 | 6 | 10 | 5 | 462.5 |
| 4 | 4 | 20 | 0 | 1 | 416.5 |
| Comparative 1 | Comparative 1 | 0 | 19 | 2 | 424.0 |
| Comparative 2 | Comparative 2 | 0 | 19 | 2 | 345.0 |
| Comparative 3 | Comparative 3 | 0 | 21 | 0 | 352.5 |
| Comparative 4 | Comparative 4 | 0 | 15 | 6 | 291.5 |
| Comparative 5 | Comparative 5 | 2 | 19 | 0 | 390.5 |
| Comparative 6 | Comparative 6 | 0 | 21 | 0 | 277.5 |
| Comparative 7 | Comparative 7 | 0 | 21 | 0 | 366.0 |
| Comparative 8 | Comparative 8 | 0 | 21 | 0 | 304.0 |
| Control | 13 | 0 | 21 | 0 | 625.0 |

Dynamic mechanical analysis was carried out Optical Elements 3 and 4 and the Control Optical Element; results are shown in FIG. 5.

What is claimed is:

1. An optical element comprising:
   an intrinsic polarizer comprising oriented vinylene segments;
   a substrate; and
   an adhesive layer disposed between the intrinsic polarizer and the substrate, the adhesive layer comprising from about 20 to about 40 wt. % of an aliphatic urethane (meth)acrylate oligomer, from about 40 to about 60 wt. % of a (meth)acryl monomer, from about 2 to about 10 wt. % of a silane, and from about 3 to about 25 wt. % of a crosslinker, the crosslinker comprising ethylene glycol diacrylate and/or pentaerythritol triacrylate.

2. The optical element of claim 1, the intrinsic polarizer comprising a KE-type polarizer.

3. The optical element of claim 1, the substrate comprising cellulose.

4. The optical element of claim 1, the substrate comprising cellulose triacetate.

5. The optical element of claim 1, the aliphatic urethane (meth)acrylate oligomer comprising a polyester polyol.

6. The optical element of claim 5, the polyester polyol comprising diethylene glycol and adipic acid.

7. The optical element of claim 1, the aliphatic urethane (meth)acrylate oligomer comprising a polyester polyol, methylene dicyclohexylisocyanate, and hydroxyethyl acrylate.

8. The optical element of claim 1, the (meth)acryl monomer comprising isobornyl acrylate and N,N-dimethylacrylamide.

9. The optical element of claim 1, the silane comprising (3-glycidoxypropyl)trimethoxysilane and [3-(2-aminoethylamino)propyl]trimethoxysilane.

10. The optical element of claim 1, further comprising a hardcoat layer disposed on the substrate opposite the adhesive layer.

11. The optical element of claim 1, further comprising a pressure sensitive adhesive layer disposed on the polarizer opposite the adhesive layer.

12. The optical element of claim 11, further comprising a second substrate disposed on the pressure sensitive adhesive layer.

13. The optical element of claim 1, wherein the peel strength between the polarizer and the substrate is at least about 400 g per 0.5 inches at 85° C.

14. An optical element comprising:
first and second substrates;
an intrinsic polarizer disposed between the first and second substrates, the intrinsic polarizer comprising oriented vinylene segments; and
first and second adhesive layers disposed between the polarizer and the first and second substrates, respectively, the first and second adhesive layers each comprising from about 20 to about 40 wt. % of an aliphatic urethane(meth)acrylate oligomer, from about 40 to about 60 wt. % of a (meth)acryl monomer, from about 2 to about 10 wt. % of a silane, and from about 3 to about 25 wt. % of a crosslinker, the crosslinker comprising ethylene glycol diacrylate and/or pentaerythritol triacrylate.

15. The optical element of claim 14, the intrinsic polarizer comprising a KE-type polarizer.

16. The optical element of claim 14, the first and second substrates comprising cellulose triacetate.

17. The optical element of claim 14, the aliphatic urethane (meth)acrylate oligomer comprising a polyester polyol, methylene dicyclohexylisocyanate, and hydroxyethyl acrylate; the (meth)acryl monomer comprising isobornyl acrylate and N,N-dimethylacrylamide; and the silane comprising (3-glycidoxypropyl)trimethoxy-silane and [3-2-aminoethylamino)propyl]-trimethoxysilane.

18. The optical element of claim 14, wherein the peel strength between the polarizer and each of the first and second substrates is at least about 400 g per 0.5 inches at 85° C.

19. A method of making an optical element, comprising:
providing an intrinsic polarizer comprising oriented vinylene segments;
providing a substrate;
dispensing a UV-curable adhesive layer between the intrinsic polarizer and the substrate to form a UV-curable layer between the polarizer and the substrate, the UV-curable adhesive layer comprising from about 20 to about 49 wt. % of an aliphatic urethane (meth)acrylate oligomer, from about 40 to about 60 wt. % of a (meth) acryl monomer, from about 2 to about 10 wt. % of a silane, and from about 3 to about 25 wt. % of a crosslinker, the crosslinker comprising ethylene glycol diacrylate and/or pentaerythritol triacrylate; and
applying actinic radiation to cure the UV-curable layer.

20. An optical device comprising:
a light source, and
the optical element of claim 1.

21. The optical device of claim 20, comprising a projection system.

22. An optical device comprising:
a light source, and
the optical element of claim 14.

23. The optical device of claim 22, comprising a projection system.

24. The optical element according to claim 1, wherein the intrinsic polarizer is a K-type or KE-type polarizer.

25. The optical element according to claim 14, wherein the intrinsic polarizer is a K-type or KE-type polarizer.

* * * * *